(No Model.)
F. BREDEHORST.
INCIDENCE WINDOW.
No. 276,761. Patented May 1, 1883.
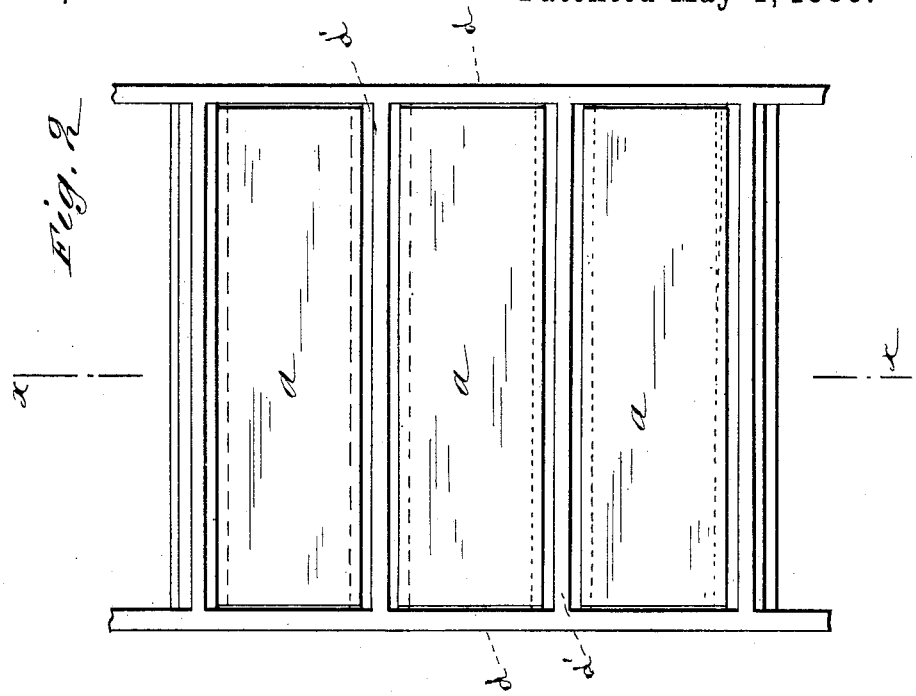
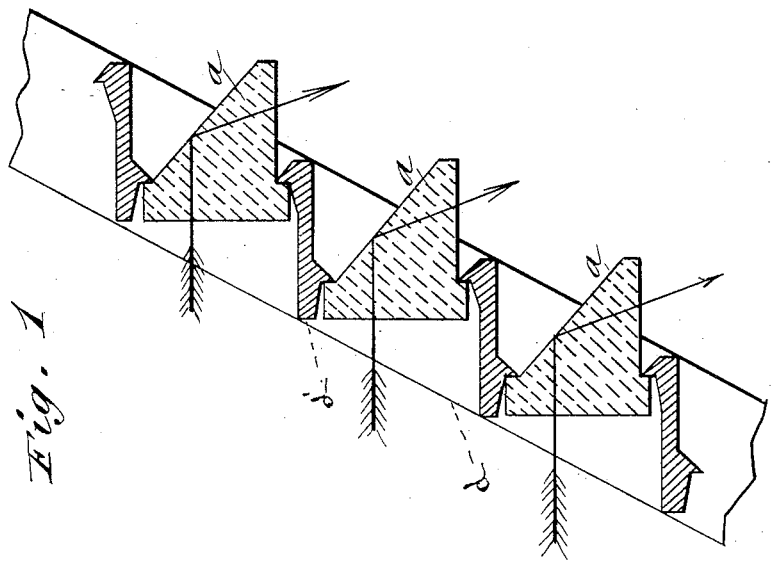
WITNESSES:
INVENTOR:
F. Bredehorst
BY Munn & Co
ATTORNEYS.

UNITED STATES PATENT OFFICE.

FRIEDRICH BREDEHORST, OF BREMEN, GERMANY.

INCIDENCE-WINDOW.

SPECIFICATION forming part of Letters Patent No. 276,761, dated May 1, 1883.

Application filed May 24, 1882. (No model.) Patented in Germany May 8, 1880, No. 12,442.

*To all whom it may concern:*

Be it known that I, F. BREDEHORST, of Bremen, Germany, have invented an Improvement in Incidence-Windows, of which the following is a specification.

The object of the invention is to light a room, hall, or apartment by incident or deflected light, as hereinafter described.

Figure 1 of the drawings is a side elevation, and Fig. 2 a front view, of a window made according to my invention.

In the drawings, $d$ represents the side frames, and $d'$ the cross-pieces of the window. $a$ is a series of half-prismatic lenses, each arranged not only beneath the one above, but also a little in front of it, the whole forming a window in the shape of a staircase, as shown in Fig. 1 of the drawings. The arrangement of the semi-prismatic lenses $a$ diagonally with respect to each other horizontally in the frame, and with the deflecting-faces upward causes the incident rays to be deflected from each lens in different lines from any of the others, and to thus diffuse the light more uniformly through an apartment.

I am aware that a downwardly-projecting semi-prism lens has been used in pavements and vault-covers; but

What I claim as new and of my invention is—

A window having the lenses $a$ arranged horizontally in the frame, diagonally to each other, and with the deflecting-faces upward, as shown and described.

In testimony whereof I have signed my name to this specification in the presence of two subscribing witnesses.

FRIEDR. BREDEHORST.

Witnesses:
HERM. OBERMAN,
T. ANTHONY.